Patented May 31, 1927.

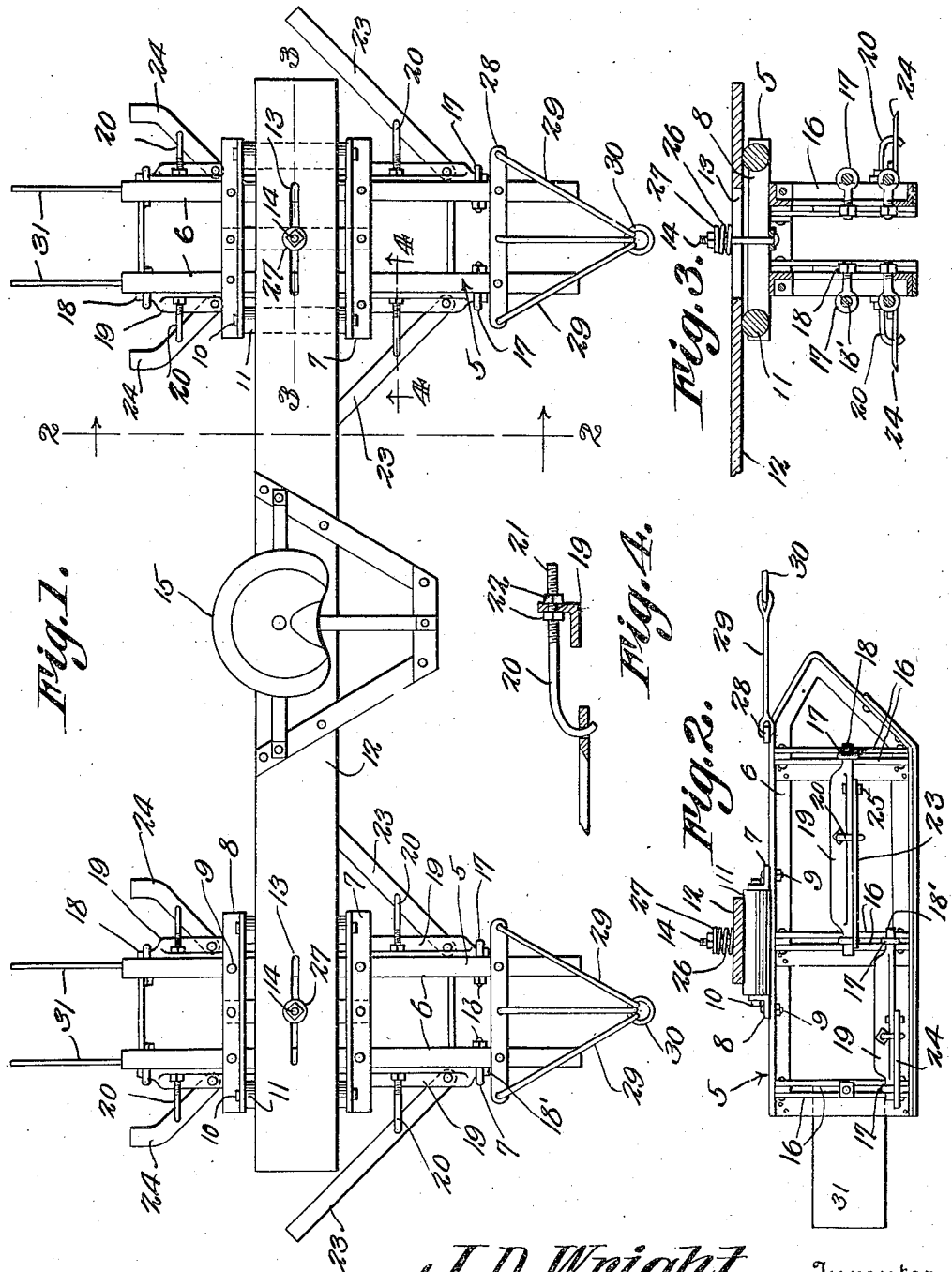

1,630,996

UNITED STATES PATENT OFFICE.

JAMES D. WRIGHT, OF ALMENA, KANSAS.

CULTIVATOR.

Application filed May 1, 1926. Serial No. 105,976.

The present invention has reference to a combined weeder and cultivator, the primary object of the invention being to provide a machine which, when operated over a planted field, will operate to cultivate growing crops, at the same time cut the weeds which may be present between the rows.

Another important object of the invention is to provide means whereby the sleds or supports forming a part of the machine may be adjusted laterally with respect to each other, thereby adapting the machine for use in rows of various widths.

A further object of the invention is to provide means for adjusting the blades of the machine to cause them to operate at various angles and widths.

With the foregoing and other objects in view which will appear as the description proceeds, the invention resides in the combination and arrangement of parts and in the details of construction hereinafter described and claimed, it being understood that changes in the precise embodiment of the invention herein disclosed, may be made within the scope of what is claimed, without departing from the spirit of the invention.

Referring to the drawing:

Figure 1 is a plan view of an agricultural machine constructed in accordance with the invention.

Figure 2 is a sectional view taken on line 2—2 of Figure 1.

Figure 3 is a sectional view taken on line 3—3 of Figure 1.

Figure 4 is a sectional detail view illustrating one of the blades supporting members, the section being taken on line 4—4 of Figure 1.

Referring to the drawing in detail, the machine embodies a pair of sleds or supports indicated by the reference character 5, each of which sleds embodies a frame constructed of angle bars and includes spaced side frames 6 which are connected by means of the transverse angle bars 7 and 8 respectively, which straddle the rows being cultivated.

These angle bars 7 and 8 are secured to the side frames 6 by means of the bolts 9 and as shown, have their ends extended beyond the frames 6 where they are formed with aligning openings defining bearings for the shafts 10 of the rollers 11 on which the beam 12 rests, which beam connects the sleds 5 in a manner as shown by Figure 1.

Arranged adjacent to each end of the beam 12 is an elongated opening 13, which openings accommodate the bolts 14 that adjustably connect the sleds and beam 12 in such a way that movement of the frames with respect to the beam 12 will be permitted for adjusting the sleds towards and away from each other.

This beam 12 also affords a support for the seat 15 on which the operator may seat himself to control the operation of the machine.

Pairs of vertical spaced bars 16 form a pair of each frame or sled and are arranged on opposite sides of each sled, the pairs of bars being arranged in spaced relation with each other. Extended between the bars of each pair are eye bolts 17 which are supplied with nuts 18 that secure the eye bolts in various positions of vertical adjustment between the bars.

These eye bolts afford supporting means for the reduced ends 18' of the supporting bars 19, which bars 19 are formed with openings to receive the rods 20 that are provided with elongated threaded portions 21 for accommodating the nuts 22 which are arranged on opposite sides of the bars 19 to clamp the rods 20 in position. The outer ends of these rods 20 are curved and extend through openings in the blades to support the blades and due to the manner in which the rods are supported, the rods 20 may be extended or retracted, adapting the device for use in connection with rows of various widths.

The blades 24 are supported below the blades 23, which blades 24 are secured to the sleds in the same manner as the blades 23. The blades 24 are substantially short and adapted for use in cultivating the soil at points adjacent to the rows, while the blades 23 which are long, are adapted to cut the weeds between the rows.

As shown by Figure 2 the blades are pivotally connected to their supporting bars as at 25 with the result that as the rods 20 are moved outwardly or inwardly, the blades will swing on their pivots.

The blades 24 may also be tilted in such a way that they will dig into the soil to loosen the same and cultivate the vegetation.

In order that slight movement of the beam 12 with respect to the bolts 14, will be permitted, coiled springs 25 are disposed between the beam 12 and washers 27 positioned on the bolt with the result that as one sled passes over an irregularity which would lift that sled, the movement of the beam 12 necessary to prevent the twisting of the sled will be permitted.

At the forward end of each sled is a bar 28 to which the rods 29 are connected, which rods have their forward ends connected with the rings 30 to which a suitable draft animal or tractor may be connected for moving the machine over the ground surface.

From the foregoing it will be seen that when the machine is moved over a field to be cultivated, the frames 6 straddle adjacent rows and the blades which are arranged on opposite sides of the frames 6 which mow the weeds and cultivate the soil between the rows.

I claim:—

1. An agricultural machine including sleds, each of said sleds embodying a frame, the frame of each sled including pairs of vertical spaced bars, eye bolts disposed between the bars of each pair, supporting bars having reduced ends fitted in the eyes of the eye bolts, blades carried by the last mentioned bars, and means for adjustably connecting the blades and bars.

2. An agricultural machine including sleds, each of said sleds embodying a frame, vertical bars arranged in pairs and disposed on opposite sides of each frame, eye bolts adjustably held between the bars of each pair, blade supporting bars mounted within the eye bolts, and means for connecting the sleds.

In testimony that I claim the foregoing as my own, I have hereto affixed my signature.

JAMES D. WRIGHT.